Patented Feb. 25, 1936

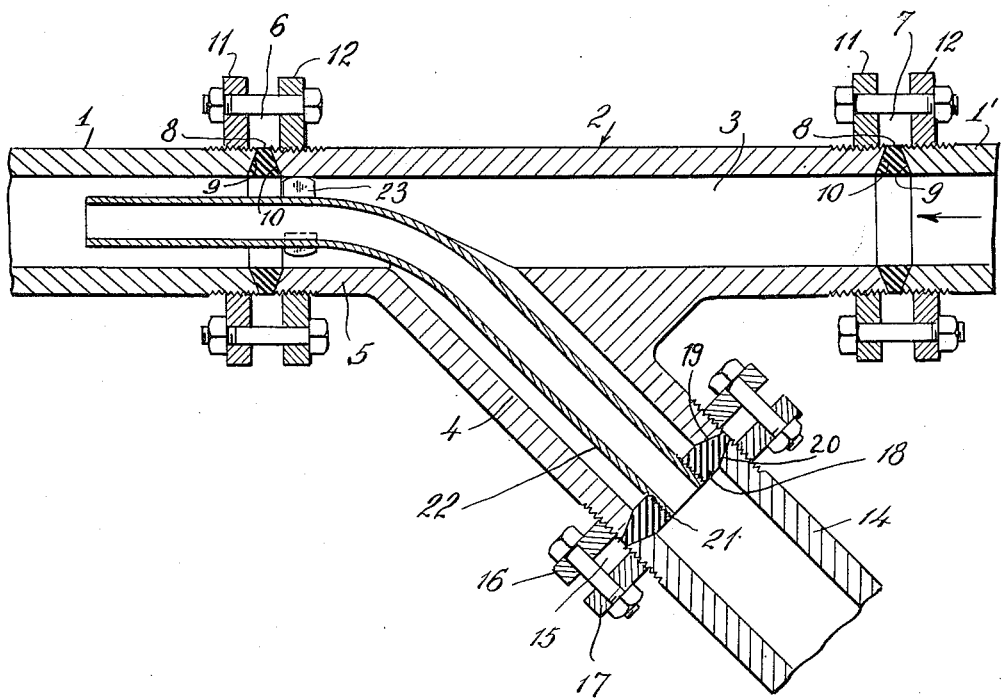

2,031,849

UNITED STATES PATENT OFFICE 2,031,849

PIPE FITTING

John J. O'Leary, Petersburg, Va., assignor to Atmospheric Nitrogen Corporation, New York, N. Y., a corporation of New York Application May 2, 1930, Serial No. 449,220

8 Claims. (Cl. 285—22)

This invention relates to branched pipe fittings and a process for protecting joints thereof from temperature variations. More particularly, this invention relates to a branched pipe fitting and a process of protecting joints thereof when employing it for the mixing of fluids under high pressures, the mixture of which is subjected to temperature variations.

It is frequently necessary to introduce into a stream of a fluid under high pressure flowing in a conduit, a second fluid having a widely differing temperature and from time to time to vary the rate of introduction so that the mixture of fluids formed is subjected to changes in temperature. For example, in the ammonia synthesis art wherein the gases on the way to catalysis are passed through heat exchangers in indirect heat exchange relationship with the hot gases leaving the catalyst, one method of controlling the reaction temperature is by by-passing a part of the gas around one or more of the heat interchangers and introducing the by-passed relatively cool gas into the hotter gas which is passed through the by-passed heat interchangers. To maintain sharp control of these temperatures it is frequently required to make changes in the flow of the gases so rapidly that the joints at the point where the by-pass line joins the main conduit are subjected to such rapidly varying changes in temperatures that uniform expansion of the various parts of the joint does not take place and the joint loosens and permits the leakage of gas.

It is an object of this invention to provide a branched pipe fitting of such design that in employing the fitting for the mixing of gases, the joints between the fitting and the conduits connected therewith are protected from changes in temperature of fluids flowing through the branches of the fitting. Other objects of the invention will in part be obvious and will in part appear hereinafter.

The invention comprises a process of protecting a joint in a conduit through which a fluid is passed from the deleterious action of temperature variations caused by the introduction of a second fluid having a different temperature from that of the first fluid, by maintaining a curtain of the fluid flowing through the conduit between the joint and the fluid introduced into the conduit and by mixing the two fluids at a point thermally remote from the joint.

The invention further comprises a branched pipe fitting comprising a stem and branches associated therewith, in which one branch is prolonged within the continuation conduit and penetrates the continuation conduit to such a distance that the joints between the pipe fitting and the conduit are at a point thermally remote from the point of termination of the branch pipe, whereby the temperature changes of the joints induced by varying temperatures of the gases from the branch pipes mixed in the conduit are insufficient to destroy the fluid tightness of the joint.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing which illustrates in cross section one type of pipe joint embodying this invention.

In the drawing, the numerals 1 and 1' indicate portions of a fluid conduit, the parts of which are joined through a branched pipe fitting 2 having branches 3 and 4 and stem 5 arranged to pass the fluid in the direction indicated by the arrow. Portion 1 of the conduit is joined to the stem of fitting 2 by means of a fluid-tight joint 6 and portion 1' is joined to branch 3 by means of a similar joint 7. Each of joints 6 and 7 comprises a gasket 8 which is brought into fluid-tight contact with surfaces 9 and 10 on conduits 1 or 1' and stem 5 or branch 3 respectively by means of bolted flanges 11 and 12.

Fitting 2 comprises a second branch 4 which, in the form shown, joins branch 3 at an angle of 45°. This type of fitting is known as a lateral branch pipe fitting. Lateral branch 4 is joined to a branch conduit 14 by means of a joint 15 comprising bolted flanges 16 and 17 and an annular gasket 18. Gasket 18 is brought into fluid-tight contact with ends 19 and 20 of branch 4 and conduit 14 respectively by means of the bolted flanges 16 and 17. The internal diameter of gasket 18 is less than the inside diameter of branch 4. The interior surface 21 of gasket 18 is threaded or otherwise adapted for joining to it in fluid-tight relationship the end of a relatively thin-walled tube 22 which, together with gasket 18, forms a continuation of conduit 14 and which passes through the interior of branch 4 and is prolonged into the interior of conduit 1 to a point outside of stem 5. Tube 22 has a substantially uniform cross sectional area and is suitably curved and has an outside diameter such that the curved portion passes the junction between stem 5 and branch 4 of the pipe fitting 2. A spacer 23 through which pipe 22 passes centers it within stem 5 and conduit 1 and serves to space it from the walls of the stem and branch 4 to form an annular passage surrounding pipe 22 within the fitting and conduit. Gasket 18 forms a fluid-tight seal between tube 22 and the open end of branch 4. Conduit 14, gasket 18, and tube 22 together constitute an open end branch conduit which penetrates fitting 2, passes through the stem of the fitting, penetrates into conduit 1 and terminates therein in an open end at a point beyond joint 6, thermally remote from this joint as well as from joints 7 and 15 between branch 3 and conduit 1' and branch 4 and conduit 14.

In employing the described fitting, for example, in an ammonia synthesis apparatus in which gas from a heat exchanger is passed in the direction of the arrow shown in the drawing through conduit 1—1', branch 3 and stem 5, branch 4 of the fitting is connected with conduit 14 which serves as a by-pass for the gases around the heat exchanger. The relatively cooler gases from conduit 14 pass through tube 22 and are introduced in concurrent flow within but separate from the stream of gas flowing through stem 5 and conduit 1—1'. The two gases mingle at the open end of tube 22 at a point thermally remote from joint 6. The gas flowing through stem 5 and conduit 1—1' forms a curtain between joint 6 and the gas flowing through tube 22 and serves to minimize the transfer of heat between the gas flowing through the tube and the walls of the fitting and of the conduit in the region of joint 6. Furthermore, by projecting tube 22 into conduit 1 to a point thermally remote from joint 6, excessive changes in temperature of the joint are prevented when the proportions of gas passing through the two branches of the fitting are varied and rapid changes in the temperature of the mixture of gases formed at the point of termination of tube 22 occur.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

When in the specification and claims the term "thermally remote from" is employed with reference to the position of a fluid-tight joint with respect to a point at which temperature changes occur, it is intended to thereby define a distance sufficiently great that under the conditions of use the pipe fitting, which include rapid changes in thermal conditions at the point at which the fluids are mixed, these changes are rendered inocuous in so far as affecting the fluid tightness of the joint is concerned.

I claim:

1. In combination with branch conduits for conveying gases having widely different temperatures and a main conduit for conveying a mixture of said gases, a branched pipe fitting having branches connected to said branch conduits and a stem joined to said main conduit by means of a packed joint, and means for protecting said packed joint from sudden changes in temperature caused by varying the relative amounts of said gases introduced into the main conduit through said fitting, said means comprising a tube mounted concentrically in one of said branches and extending therethrough, through the stem of the fitting and to within said main conduit beyond said packed joint, whereby the temperature condition of said joint is maintained substantially constant.

2. In combination with branch conduits for conveying fluids having widely different temperatures and a main conduit for conveying a mixture of said fluids, a pipe fitting having branches connected to said branch conduits and a stem joined to said main conduit by means of a separable joint, and means for protecting said joint from sudden changes in temperature caused by varying the relative amounts of said fluids introduced into the main conduit through said fitting, said means comprising a tube mounted within one of said branches and communicating with the branch conduit connected to said branch, said tube traversing the stem of the fitting and extending within the main conduit beyond said joint, whereby the temperature condition of said joint is maintained substantially constant.

3. In combination with branch conduits for conveying fluids having widely different temperatures and a main conduit for conveying a mixture of said fluids, a pipe fitting having branches connected to said branch conduits and a stem joined to said main conduit by means of a separable joint, and means for protecting said joint from sudden changes in temperature caused by varying the relative amounts of said fluids introduced into the main conduit through said fitting, said means comprising a tube passing through one of said branches and said stem and extending within the main conduit beyond said joint, said tube communicating with one of said branch conduits for conducting the fluid from said branch conduit to within the main conduit, whereby the temperature condition of said joint is maintained substantially constant.

4. In combination with branch conduits for conveying gases having widely different temperatures and a main conduit for conveying a mixture of said gases, a branched pipe fitting having branches connected to said branch conduits and a stem joined to said main conduit by means of a packed joint, and means for protecting said packed joint from sudden changes in temperature caused by varying the relative amounts of said fluids introduced into the main conduit through said fitting, said means comprising an open-ended tube spaced from the walls of and traversing one of said branches and the stem of the fitting and extending beyond said packed joint into said main conduit, and an annular gasket associated with an end of said tube and forming a fluid-tight seal between said tube and the end of the branch conduit through which the tube passes, whereby the temperature condition of said joint is maintained substantially constant.

5. Process for the admixture of two gas streams of dissimilar temperatures which comprises passing one of said gas streams through a conduit, passing the other gas stream through an annular space surrounding said conduit and within a jointed conduit, flowing said gas streams concurrently to each other in heat exchange relationship but not in direct contact past the joint of said jointed conduit, and thereafter directly contacting the two gas streams.

6. Process for the admixture of two gases of dissimilar temperatures in a jointed conduit which comprises passing a stream of one of said gases through a second conduit, surrounding said second conduit with the succession of a stationary column and a concurrently flowing stream of said other gas passing through said jointed conduit, maintaining said streams of gases separate until after the gases have passed the joint of said jointed conduit, and thereafter directly contacting the two gases.

7. In a process for the synthesis of ammonia wherein a nitrogen-hydrogen gas is heated, the heated gas is mixed with a cooler nitrogen-hydrogen gas in a jointed conduit and the mixture is passed in contact with an ammonia synthesis catalyst the improvement which comprises flowing said gases past the joint of said conduit and into the conduit while maintaining the gases in heat exchange relationship but out of direct contact with each other and maintaining a curtain of one of said gases between said joint and the other of said gases.

8. In combination with branch conduits for conveying gases having widely different temperatures and a main conduit for conveying a mixture of said gases, a branched pipe fitting having branches connected to said branch conduits and a stem connected to said main conduit by a separable connection, and means for protecting said separable connection from sudden changes in temperature, said means comprising a tube disposed in one of said branches and extending through said stem of the fitting to a point within said main conduit beyond said separable connection, said tube being spaced from the walls of said stem and the walls of said main conduit to permit the flow of gases through said stem and main conduit past said separable connection in heat exchange relationship but out of contact with the gases flowing through said tube, whereby stresses in said connection due to changes in temperature are minimized.

JOHN J. O'LEARY.